March 31, 1964 J. S. MURRAY 3,127,569
VALVE AMPLIFIER PUSH-PULL OUTPUT STAGE
Filed Oct. 25, 1960
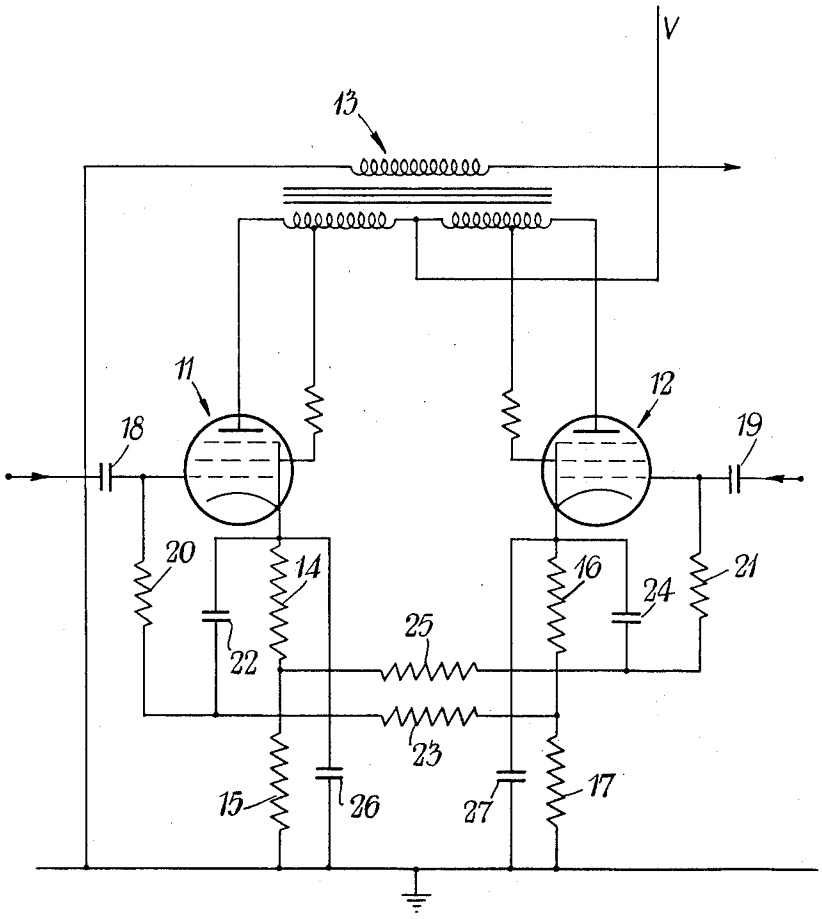
Inventor
John S. Murray
by Malcolm W. Fraser
attorney United States Patent Office 3,127,569

Patented Mar. 31, 1964

3,127,569
VALVE AMPLIFIER PUSH-PULL OUTPUT STAGE

John Somerset Murray, 7 Ranulf Road,
London N.W. 2, England

Filed Oct. 25, 1960, Ser. No. 64,931
Claims priority, application Great Britain Oct. 29, 1959
3 Claims. (Cl. 330—122)

The present invention relates to a valve amplifier, and in particular to a push-pull output stage of a valve amplifier.

It is an object of the invention to provide in a valve amplifier a push-pull output stage which introduces substantially no intermodulation at audio frequencies and which permits the amplifier to be provided with overall negative feedback which is effective down to substantially lower frequencies than has hitherto been possible, without risk of the amplifier becoming unstable at such very low frequencies.

According to the invention there is provided a valve-amplifier push-pull output stage comprising first and second valves each having an anode, a control grid and a cathode, both anodes being connected to output means of the stage, each control grid being connected to a respective signal input point and the cathodes of the first and second valves being connected respectively to first and second cathode resistances, each cathode resistance having a tapping intermediate its ends, wherein there are provided first and second grid leak resistances connected to the control grids of the first and second valves respectively, first and second cathode decoupling condensers connected across the first and second cathode resistances respectively, first and second grid-circuit condensers connected at respective grid-circuit junctions to the first and second grid leak resistances respectively and in series therewith between the control grid and cathode of the first and second valves respectively, and first and second cross-connecting resistances connecting, respectively, the grid-circuit junction between the first grid leak condenser and the first grid-circuit condenser to the tapping of the second cathode resistance and the grid-circuit junction between the second grid leak condenser and the second grid-circuit condenser to the tapping of the first cathode resistance, and wherein the time constants associated with the first grid-circuit condenser and the first cross-connecting resistor and with the second grid-circuit condenser and second cross-connecting resistance are greater than the respective time constants associated with the first cathode resistance and first cathode decoupling condenser and, respectively, with the second cathode resistance and second cathode decoupling condenser.

A preferred embodiment of an audio-frequency valve-amplifier push-pull output stage according to the invention is illustrated in the accompanying drawing.

As shown in the drawing, the valve-amplifier output stage comprises first and second valves 11 and 12, each having an anode, a cathode and a control grid, of which the anodes are connected to respective ends of a primary winding of a transformer 13, which constitutes output means of the stage, the centre tap of the primary winding having applied to it a voltage V. The cathodes of the valves are connected to earth through first and second cathode resistances constituted by cathode resistors 14 and 15 in series and, respectively, cathode resistors 16 and 17 in series. The control grids of the two valves are connected through first and second input condensers 18 and 19 respectively to respective signal input points to which driving signals in opposite phase may be applied to drive the output stage in push-pull; and, further, the control grids of the two valves are provided with first and second grid leak resistances 20 and 21 respectively.

Output signals from the stage appear at one end of the secondary winding of the transformer 13, the other end being earthed. In the illustrated output stage, the two valves are pentodes, each having, in addition to its anode, cathode and control grid, a suppressor grid connected internally to its cathode and a screen grid connected through a high-frequency blocking resistor to a tapping on the primary winding of the transformer 13.

It would be possible, in a circuit such as has been described thus far, to connect the lower end of the first grid leak resistor 20 to the junction of the cathode resistors 16 and 17, which constitutes a tapping intermediate the ends of the second cathode resistance, and correspondingly to connect the lower end of the second grid leak resistor 21 to the junction of the cathode resistors 14 and 15 which constitutes a tapping intermediate the ends of the first cathode resistance. To do this would be effective to impose on the two valves, even if they were not carefully matched, an equalisation of the cathode currents which would be very desirable. Assuming the resistors 14 and 16 to be of equal value and the resistors 15 and 17 to be also of equal value, connection of the resistors 20 and 21 in this way would reduce any unbalance by a factor equal to the ratio of the sum of the resistances 15, 16 and 17 to resistance 14. However, in the absence of any means for decoupling the cathodes to earth (and to provide such cathode decoupling has hitherto been considered impracticable as introducing insuperable difficulties in other respects, as referred to below), or at very low frequencies at which such cathode decoupling is ineffective even if provided, the effect of connecting the grid leak resistor 20 to the junction of the resistors 16 and 17 is the same as if the grid leak resistor 20 had been connected directly to earth but had been of reduced value, i.e., as if the time constant associated with the first input condenser 18 and the first grid leak resistor 20 were reduced. In respect of this time constant, therefore, and thus in respect of the very low frequency performance of the stage, connection of the first grid leak resistor 20 to the junction of the resistors 16 and 17 would have significant undesired effects, since values of the condenser 18 and the resistor 20 cannot be increased indefinitely if trouble due to emission from the grid of the valve 11 is to be avoided; and thus there would be a distinct limit on the maximum value of the associated time constant, which is an important element in determining the low frequency gain characteristic of the stage, and which, as is well known, has to be controlled if instability, of well known kind obeying Nyquist's law, is to be avoided when overall negative feedback is applied to the amplifier in which the output stage is comprised.

A further kind of instability which must be guarded against is that which can be occasioned if the inductance of the primary winding of the transformer 13 varies with the magnetisation so that the stage tends to behave as a "parametric" amplifier. Instability of this kind may occur even in the absence of applied overall negative feedback, particularly if there exists through the voltage supply source any appreciable accidental feedback, to preceding stages, of the kind which tends to produce "motor-boating."

To overcome the disadvantages of a reduced time constant at the valve control grids and to eliminate any tendency to instability due to a combination of a tendency to motor-boat via the common supply and of magnetisation-dependent inductance of the output transformer, there are provided according to the invention, and as shown in the drawing, a first-grid circuit condenser 22 and a first cross-connecting resistor 23 by which the lower end of the first grid leak resistor 20 is connected to the cathode of the valve 11 and, respectively, to the junction of the resistors 16 and 17; and correspondingly, the lower end of the second grid leak resistor 21 is connected by a second grid-circuit condenser 24 to the cathode of the valve 12 and by a second cross-connecting resistor 25 to the junction of the resistors 14 and 15.

Briefly, the effects of providing the condensers 22 and 24 and the resistors 23 and 25 are these: firstly, since the condensers 22 and 24 are made of large capacity, each grid leak resistor is decoupled, even at very low frequencies, to the cathode of the corresponding, instead of to the other, valve and the grid time constant therefore enjoys the augmentation which is familar in cathode followers instead of suffering a reduction; and secondly, the condensers 22 and 24 are large enough to cause a phase advance, even at very low frequencies, in the circuit comprising the grid and cathode of the valve 11, the grid and cathode of the valve 12, and the resistors and condensers associated therewith, and thus to destroy the gain of the stage insofar as it tends to behave as a parametric amplifier due to magnetisation-dependence of the inductance of the transformer 13.

If the condensers 22 and 24 and the resistors 23 and 25 were omitted, and the grid leak resistors 20 and 21 were connected directly to the junctions of the resistors 16 and 17, 13 and 15 respectively, then a consideration of the grid time constant and the time constant of the transformer 13 would show that the asymptote of the low frequency end of the gain characteristic of the amplifier would necessarily reach 12 db/octave, and the amplifier be unstable at low frequencies, if any large amount of negative overall feedback were applied and there were included in the low-frequency overall feedback loop any other time constant or step circuit. It is probably for this reason that few, if any, known amplifiers covering the whole audio spectrum are provided with any cathode decoupling at all of the power valves. However, by providing the condensers 22 and 24 and the resistors 23 and 25 in accordance with the invention, the frequency at which the feedback loop gain reaches unity may be reduced by as much as one and a half octaves. It may thereby be ensured that, even when other time constants and step circuits are introduced in earlier stages of the amplifier, the average slope of the gain at frequencies above this lower frequency can be maintained at less than 12 db/octave; and the safe margin of gain and phase thus provided permit the application of substantial overall negative feedback down to a frequency which is one and a half octaves lower than would otherwise be permissible. It also means that, as shown, the cathodes of the valves 11 and 12 may safely be decoupled directly to earth by condensers 26 and 27, with resultant increase in the gain of the illustrated output stage. Further, the decoupling of the cathodes by condensers 26 and 27 substantially eliminates any intermodulation of the signal which would otherwise occur as a result of distorted (class B) currents in the cathode resistors. In the first place, the distorted (class B) cathode currents no longer effectively modulate the H.T. supply with voltages at even harmonics of the signal frequencies, thereby causing direct intermodulation in the anode circuit; and in the second place, the increased gain in the output stage (by as much as 11 db in certain cases) allows the earlier stages to operate at correspondingly lower signal voltage levels thereby introducing less distortion in the earlier stages.

In practice, an output stage such as that illustrated may be designed on the basis that the grid input condensers 18 and 19 and the grid leak resistances 20 and 21 have reasonable practical (i.e., normal) values, so that the time constant associated with the input condenser 18 and grid leak resistor 20, or with the input condenser 19 and grid leak resistor 20, has a value which is normal for the input circuit to a control grid of a valve; that the time constant associated with the cathode decoupling condenser 26 and cathode resistance 14 and 15, or with the cathode decoupling condenser 27 and cathode resistance 16 and 17, is made several times greater, and that, finally, the time constant associated with the grid-circuit condenser 22 and cross-connecting resistor 23 or correspondingly with the grid-circuit condenser 24 and cross-connecting resistor 25, is made several times as large again.

In a successful output stage in accordance with the drawing, using EL84 valves as the valves 11 and 12, and designed for a voltage V of 335 volts, the component values were as follows:

| | | |
|---|---|---|
| Resistors: | | |
| **14, 16** | ohms | 270 |
| **15, 17** | do | 270 |
| **20, 21** | do | 220K |
| **23, 25** | do | 33K |
| Condensers: | | |
| **18, 19** | μf | .25 |
| **22, 24** | μf | 100 |
| **26, 27** | μf | 1000 |

The amplifier of which this was the output stage was arranged to have about 25 db of feedback over the useful audio band of 40 c./s. to 16 kc./s. The feedback outside these limits must of course fall at controlled rates, but on the low frequency side the feedback was still as high as 20 db at 20 c./s. and there was at least a 10 db gain margin. It will be evident to those skilled in the art that the precise engineering of the low-frequency gain characteristic of the amplifier as a whole must depend on the careful selection of the time constants of the intervalve couplings and of any inherent step circuits as produced by decoupling components in the earlier stage. In fact, the early stages of the specific amplifier of whose output stage details are given above were designed in accordance with the invention disclosed in British specification No. 846,344.

What I claim is:

1. A valve-amplifier push-pull output stage comprising first and second valves each having an anode, a control grid and a cathode, both anodes being connected to output means of the stage, each control grid being connected to a respective signal input point and the cathodes of the first and second valves being connected respectively to first and second cathode resistances, each cathode resistance having a tapping intermediate its ends, there being provided, first and second cathode decoupling condensers connected across the first and second cathode resistances respectively, first and second grid leak resistances connected, respectively, between the control grid of the first valve and a first grid-circuit junction and between the control grid of the second valve and a second grid-circuit junction, first and second grid-circuit condensers connected respective by between the first grid-circuit junction and the cathode of the first valve and between the second grid-circuit junction and the cathode of the second valve, and first and second cross-connecting resistances connecting, respectively, the first grid-circuit junction to the tapping of the second cathode resistance and the second grid-circuit junction to the tapping of the first cathode resistance, wherein the time constants associated with the first grid-circuit condenser and first cross-connecting resistor and with the second grid-circuit condenser and second cross-connecting resistance are greater than the respective time constants associated with the first cathode resistance and first cathode decoupling condenser and, respectively, with the second cathode resistance and second cathode decoupling condenser.

2. An output stage as claimed in claim 1, wherein the control grids of the first and second valves are connected to the respective signal input points through first and second input condensers, and the time constants associated with the first input condenser and first grid leak resistance and with the second input condenser and second grid leak condenser are less than the respective time constants associated with the first cathode resistance and the first cathode decoupling condenser and, respectively, with the second cathode resistance and second cathode decoupling condenser.

3. An output stage as claimed in claim 1, wherein the said output means includes an output transformer having a primary winding with a centre tap, the anodes of the first and second valves being connected to the opposite ends of the primary winding.

References Cited in the file of this patent

UNITED STATES PATENTS

| | | |
|---|---|---|
| 2,204,578 | Davis | June 18, 1940 |

FOREIGN PATENTS

| | | |
|---|---|---|
| 990,027 | France | May 30, 1951 |
| 64,203 | France | May 25, 1955 |